(12) United States Patent
Moran et al.

(10) Patent No.: US 9,725,096 B2
(45) Date of Patent: Aug. 8, 2017

(54) METHOD AND APPARATUS FOR GENERATING AND INDICATOR OF A RISK LEVEL IN OPERATING SYSTEMS

(71) Applicants: Robert Moran, Largs (GB); Derek Beattie, Giffnock (GB); Andrew Birnie, Bearsden (GB)

(72) Inventors: Robert Moran, Largs (GB); Derek Beattie, Giffnock (GB); Andrew Birnie, Bearsden (GB)

(73) Assignee: NXP USA, Inc., Austin, TX (US)

( * ) Notice: Subject to any disclaimer, the term of this patent is extended or adjusted under 35 U.S.C. 154(b) by 21 days.

(21) Appl. No.: 14/434,459

(22) PCT Filed: Oct. 10, 2012

(86) PCT No.: PCT/IB2012/055470
§ 371 (c)(1),
(2) Date: Apr. 9, 2015

(87) PCT Pub. No.: WO2014/057309
PCT Pub. Date: Apr. 17, 2014

(65) Prior Publication Data
US 2015/0266484 A1    Sep. 24, 2015

(51) Int. Cl.
*B60W 40/08* (2012.01)
*B60W 40/09* (2012.01)

(52) U.S. Cl.
CPC ............ *B60W 40/08* (2013.01); *B60W 40/09* (2013.01)

(58) Field of Classification Search
CPC .............................. B60W 40/08; B60W 40/09
See application file for complete search history.

(56) References Cited

U.S. PATENT DOCUMENTS

| 6,496,831 B1 | 12/2002 | Baulier et al. |
| 6,499,078 B1 | 12/2002 | Beckert et al. |
| 6,813,562 B2 | 11/2004 | Altan et al. |

(Continued)

FOREIGN PATENT DOCUMENTS

| EP | 2485027 A1 | 8/2012 |
| WO | 2012060513 A1 | 5/2012 |

OTHER PUBLICATIONS

International Search Report and Written Opinion correlating to PCT/IB2012/055470 dated Apr. 25, 2013.

*Primary Examiner* — Sisay Yacob

(57) ABSTRACT

A method and apparatus for generating an indicator of a risk level in motor vehicle and notifying vehicle systems when a risk level is above a specific threshold includes, receiving a plurality of driver distraction indicators, assigning a weighting value to each indicator, applying a scaling factor to the weighting value assigned to those indicators which are identified as being related, and summing the weighting values to produce an output value indicating a risk level. Distraction indicators can include on-board system and sensor outputs and stored data relating to driver attributes. Related indicators may comprise those distraction indicators relating to environmental conditions (eg. rain and low ambient light levels), or to vehicle performance to driver concentration level (eg. in-car phone and navigation system). The scaling step allows the weighting process to be refined based on the status of other received indicators.

7 Claims, 3 Drawing Sheets

(56) References Cited

U.S. PATENT DOCUMENTS

| | | |
|---|---|---|
| 6,988,156 B2 | 1/2006 | Musumeci |
| 7,831,350 B2 | 11/2010 | Goudy |
| 8,275,497 B2 | 9/2012 | Koch-Groeber et al. |
| 2003/0149545 A1 | 8/2003 | Shu et al. |
| 2003/0236602 A1 | 12/2003 | Kuge et al. |
| 2004/0073367 A1 | 4/2004 | Altan et al. |
| 2010/0171640 A1* | 7/2010 | Delia ........................ G08G 1/07 340/907 |
| 2011/0213628 A1* | 9/2011 | Peak ........................ G06Q 40/08 705/4 |
| 2012/0041633 A1 | 2/2012 | Schunder et al. |

\* cited by examiner

METHOD AND APPARATUS FOR GENERATING AND INDICATOR OF A RISK LEVEL IN OPERATING SYSTEMS

FIELD OF THE INVENTION

This invention relates to a method and apparatus for generating an indicator of a risk level in operating systems and has particular application to determining risk levels associated with driving a vehicle.

BACKGROUND OF THE INVENTION

There are many factors which affect the amount of concentration that a driver may devote to the primary task of driving a vehicle. As the number of devices (such as car phones, navigation systems, infotainment systems) provided in vehicles continues to increase, the opportunity for a driver to become distracted from driving the vehicle also increases. Many reported automobile accidents involve some sort of driver distraction. Actions which are considered to be secondary tasks, such as pushing a button or adjusting a knob (eg. tuning a radio or adjusting the heating controls) often require the driver to glance away from the road ahead in order to locate the button or knob. While the driver is glancing away from the road ahead to perform this secondary task, the driver's attention to the primary task of driving the vehicle is distracted and thus secondary tasks are associated with an increased level of risk. Because of the increased risk associated with driver distraction, it is desirable to provide a system that utilises a measure of driver distraction which is derived from the driver's manipulation of controls, in order to adjust various parameters of the vehicle to account for the drivers lack of attention to driving.

US-A-20030149545 discloses a method for calculating an indicator of driver distraction during performance of a task by the driver based on a correlation of the type and elapsed time of the task with other information in order to facilitate a threat assessment decision.

GB-A-2485027 discloses a method which can be employed for lowering the threshold for issuing a warning message when it is detected that the driver is activating a control such as a seat adjuster.

US-A-20040073367 discloses a method for alerting the driver of a vehicle of a potential collision with a detected object by calculating a predicted acceleration of the vehicle and taking into account whether the driver is activating the vehicle's radio or heating system.

Performing a secondary task whilst driving is only one of several factors which can affect a risk level. For example, environmental factors such as whether it is dark or not and whether it is raining will also have an influence. If the driver has been driving for a long time and therefore may be tired, or if the cabin conditions are uncomfortable in any way then factors such as these may also contribute to the risk level. The primary task of driving the vehicle also has its own associated risk level. A high workload such as frequent changes in steering angle, gear changing or braking can be associated with a higher risk level than cruising at a constant speed with little or no change in direction.

Information on the aforementioned factors and other factors of a similar nature which may have some bearing on the drivers ability to maintain concentration or which may affect the safety of the vehicle and its occupants, may be gathered by the various on-board systems and sensors which are fitted to a vehicle. For example the various control management systems in the vehicle can readily monitor steering angle deflection, braking effort and vehicle speed. Sensors on the vehicle can detect if it is raining and the ambient light level. Navigation systems can monitor distance travelled and journey time. A radio or heating control can record when it is being adjusted. A head position sensor can monitor head movements of the driver to indicate if his/her eyes have been taken off the road for any length of time. Information relating to such factors which affect level of risk will be referred to hereafter as "distraction indicators." It would be advantageous to provide filtering of all these distraction indicators in order to arrive at an estimation of a risk level which may be utilised by an on-board safety system such as a collision avoidance system for example.

SUMMARY OF THE INVENTION

The present invention provides a method and apparatus for determining a risk level in a manually-operated system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Although the examples given herein are described with reference to an operating system which comprises a manually-driven vehicle such as a passenger car or automobile, it will be understood that the principles and concepts described may be equally applicable to other manually-operated systems. For example such systems could comprise industrial machinery, an aircraft, a seagoing vessel to name but a few.

Furthermore, the principles and concepts described herein may be equally applicable to autonomous operating systems such as an autonomously-driven vehicle, for example.

Figure 1:
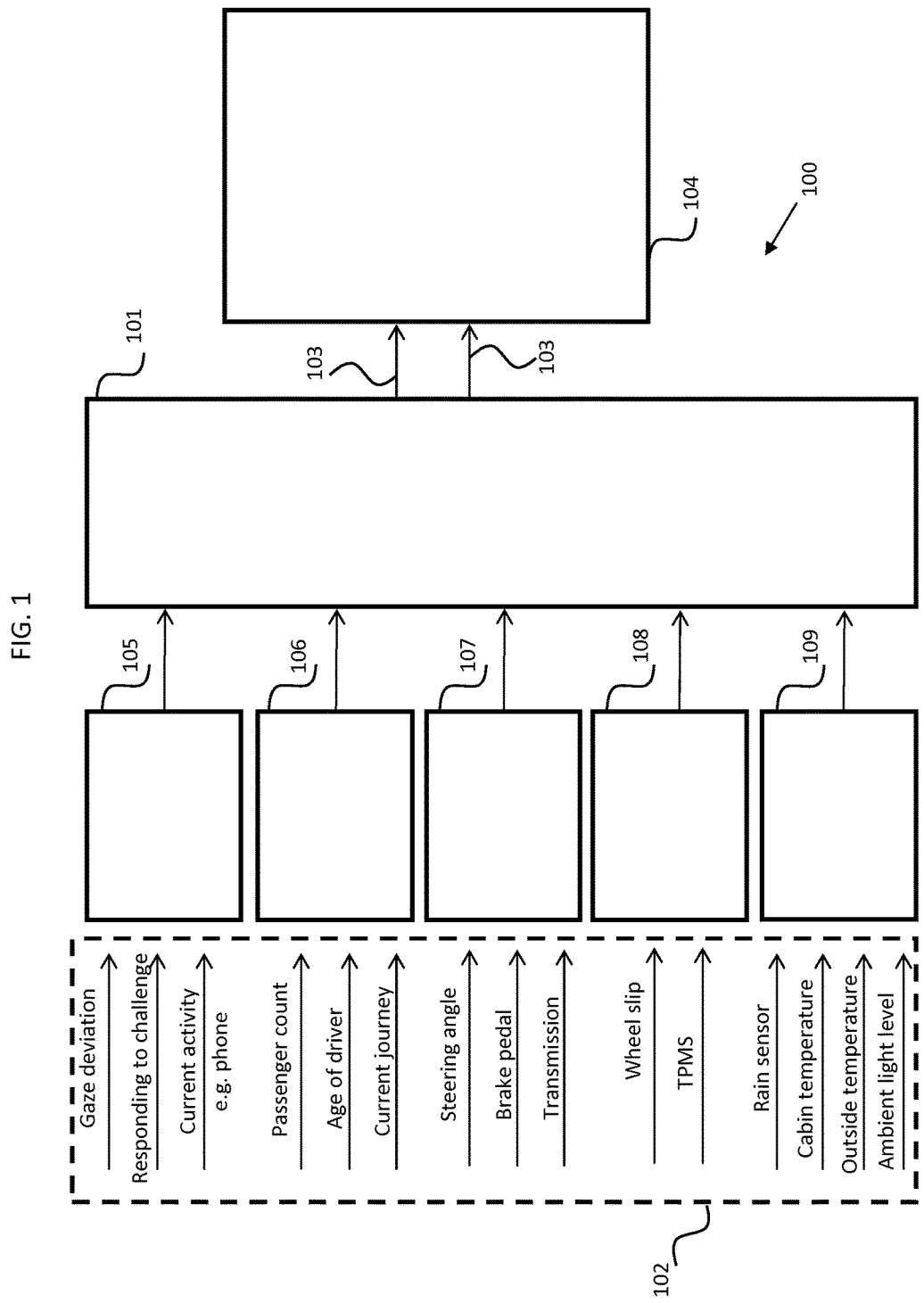
FIG. 1 shows a simplified block diagram of an example of an operator distraction control system incorporating an apparatus for determining a risk level.

FIG. 1, shows an operator distraction control system 100 which in one example, may be implemented in a driver-operated vehicle such as a passenger car (or automobile). Apparatus 101 for determining a risk level receives a plurality of inputs 102 (to be described in greater detail below) and generates one or more output channels 103 indicative of a level of risk. The output channels 103 may be fed into a control module 104. The control module may use the risk levels indicated on one or more of the output channels in one or more decision processes relating to risk mitigation. In the automobile example, the control module 104 may, for example, form a part of a collision avoidance system or it may be arranged to generate an alert message to the driver. Alternatively, it may be arranged to alter a vehicle operating condition such as increasing a gap in an adaptive cruise control system.

In the example of the application of the invention to an autonomously-driven vehicle, one or more of the output channels indicating a level of risk may be used by the vehicle's control system to make decisions on what course of action to take next.

One particular and advantageous feature of an example of the invention is the facility for notifying one or more vehicle control systems when a risk level is above a specific threshold. This reduces the overhead of monitoring the risk level for other systems within the vehicle. For example, risks to driver distraction are only propagated to other vehicle systems when it is perceived that a risk is above a certain safe level (or threshold). In this fashion, the apparatus 101 may be considered as a "distraction filter." Only the most risky situations cause a notification to be sent to vehicle systems. All other (ie. less risky) situations are filtered out and ignored.

The inputs 102 received by the apparatus 101 comprise distraction indicators and include information relating to factors which may affect the level of risk to an operating system and/or an operator of a manually-operated system. Any number of distraction indicators may be fed into the apparatus 101 for subsequent processing. How many distraction indicators are used and what they relate to is a matter of choice. In the automobile example, the inputs 102 may comprise, for example, information provided by on-board sensors and/or information stored in an on-board memory. As an example, in FIG. 1 fifteen distraction indicators are shown which may be input into the apparatus 101. These fifteen distraction indicators fall into five categories; a first 105 relating to dynamic human behaviour, a second, 106, relating to Human information, a third, 107 relating to driver workload, a fourth, 108 relating to vehicle behaviour and a fifth 109 relating to environmental conditions.

A first distraction indicator labelled "gaze deviation" is an input that may be provided by the output of a head movement monitor. If it is detected that the driver is looking out of a side window for any appreciable length of time, then this fact may be taken into account by the risk level determination apparatus 101. A "responding to challenge" input may be provided by an on-board system which requires the driver to respond to an audible prompt (by pressing a button on the steering wheel, for example). This input may be used to indicate that the driver's response time is above a particular threshold level. If this is the case, then the apparatus 101 may take this into account. A "current activity-phone" input may be provided by a connection to an on-board carphone which indicates that the driver is occupied in a telephone conversation. This information may also be used by the apparatus 101 in determining a risk level as a telephone conversation can be a source of distraction to the driver.

The second category 106 of distraction indicators relates to human information. The examples given in FIG. 1 are passenger count, the age of the driver and the current journey. An input from a seat occupancy sensor can provide an indication of passenger count. Driver's age may be provided from an on-board memory and information concerning the journey can be provided by an on-board navigation system. If, for example, there are no passengers (to distract the driver) and the journey is a familiar one, then the apparatus 101 may give little or no weight to these factors.

The third category 107 of distraction indicators relates to factors affecting the workload of the driver and may be provided by on-board control systems and sensors. Three examples given in FIG. 1 are steering angle, brake pedal and transmission inputs. A period of frequent steering movements and brake pedal activation and gear changes would indicate a high workload being placed on the driver. This is a factor that the apparatus 101 may take into account when determining a risk level.

The fourth category 108 of distraction indicators relates to vehicle behaviour and the example here in FIG. 1 of wheel slip and TPMS (tyre pressure monitoring system) may be provided by on-board sensors or control systems. A low tyre pressure or detected wheel slip may contribute to an accident risk and may be taken into account by the apparatus 101.

The fifth category 109 of distraction indicators relates to environmental factors which may be provided by on-board sensors. Four examples given in FIG. 1 are an input from a rain sensor, readings of cabin and outside temperatures and an input from an ambient light level sensor. These inputs may inform the apparatus 101 of hazardous driving conditions such as the presence of rain or ice or poor light levels. Cabin temperature has an effect on driver comfort and therefore his concentration.

The inputs 102 comprising the distraction indicators are received by the apparatus 101 which, initially, may determine if a particular input should be considered. In one example, the apparatus 101 may perform a comparison of the raw data received with a pre-set value or threshold or condition. For example, if the tyre pressure monitoring system does not indicate any loss of pressure then this input need not be taken into account in any risk level determining process. On the other hand, if the rain sensor indicates that it is raining, then this input may be taken into account by the apparatus 101.

For each input that the apparatus 101 determines should be considered, a weighting value is assigned to it. The weighting value may be related to the inherent risk of the particular distraction indicator concerned as an independent and stand-alone input in the context of driver distraction. Weighting values for each distraction indicator may be pre-determined. It may be pre-determined, for example, that a higher weighting value should be assigned to TPMS indicating low tyre pressure than to the input relating to passenger count.

The apparatus 101 may further be adapted to define relationships between two or more distraction indicators. Such related distraction indicators may represent system operating conditions which, when taken in combination with each other, may constitute a higher risk that each would in isolation. In the example of a driver-operated vehicle, related distraction indicators may include, for example, distraction indicators which relate to environmental conditions. Alternatively, related distraction indicators may include distraction indicators which relate to vehicle behaviour. As a further example, related distraction indicators may include distraction indicators which relate to driver concentration level. For those distraction indicators identified by the apparatus 101 as being related, the weighting values which have been assigned to these distraction indicators may be scaled by a predetermined scaling factor. This scaling process allows the weighting associated with a distraction indicator to be more realistic, taking into account the status of other distraction indicators.

The apparatus 101 may be further arranged to sum the weighting values (including those which have been scaled) assigned to each distraction indicator comprising a category to produce a summed output channel indicative of a risk level. Distraction indicators which belong to other categories may be treated in the same fashion. Thus, multiple outputs (channels) indicating a risk level may be generated.

In one example, a summed output may be compared with a predetermined threshold. If the summed output exceeds the threshold then a modified output value indicating a risk level may be generated on line 103 and applied to the control module 104. The control module 104 may use one or more thresholded, output channels in a risk mitigation or collision avoidance system or process.

Examples of the outputs that the apparatus 101 may generate are; (i) and indicator that the risk of a specific channel is above the threshold (i.e. a binary signal); (ii) a risk value of a specific channel (i.e. a specific decimal number).

An example of an apparatus for generating an indicator of a level of risk and a method of operating the apparatus will now be described with reference to FIG. 2 and FIG. 3.

Figure 2:
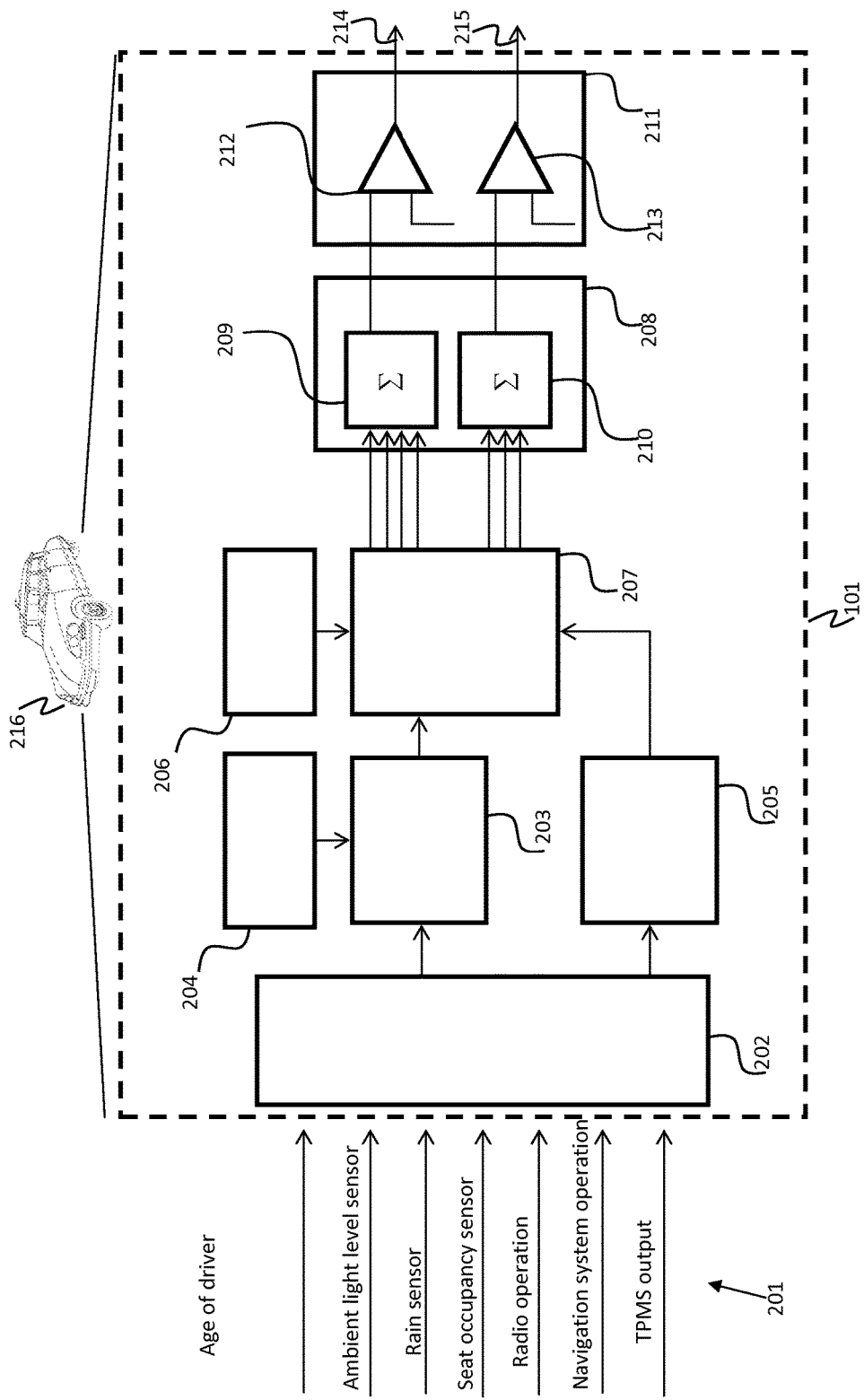
FIG. 2 shows a simplified block diagram of an example of an apparatus for determining a risk level.

FIG. 2 shows the apparatus 101 of FIG. 1 in greater detail. The apparatus illustrated in FIG. 2 is just one example embodiment of apparatus for generating a risk level indication. It will be appreciated by those skilled in the art that one or more of the various modules described and illustrated in FIG. 2 may be supplemented or combined with other modules or each other, without degrading the basic functionality of the apparatus as a whole.

Figure 3:
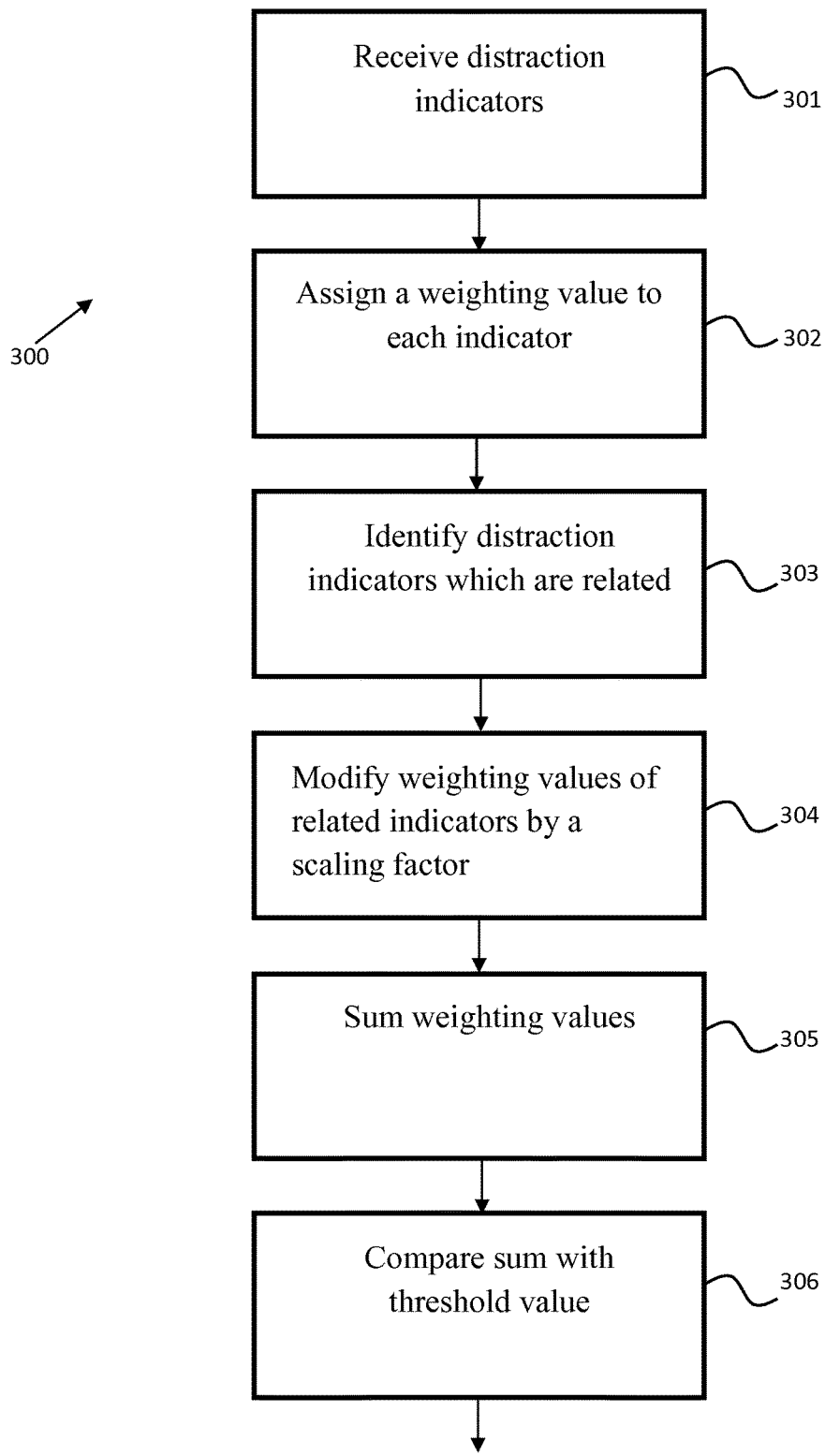
FIG. 3 shows a simplified flowchart of an example of a method for determining a risk level.

FIG. 3 is a simplified flowchart of an exemplary method 300 of operating an apparatus for generating an indication of a level of risk in a manually-operated system.

At step 301, a plurality of operator distraction indicator inputs 201 are fed into a first module 202 which is arranged to receive the plurality of operator distraction indicators. 201. At least one distraction indicator is designated as being related to at least one other distraction indicator. A memory 204 stores weighting values which are accessible by a second module 203. At step 302, the second module assigns a stored weighting value to each received distraction indicator. At step 303, a third module 205 identifies those received distraction indicators which are related. A store 206 is provided for storing scaling factors which are accessible by a. fourth module 207. At step 304, the fourth module applies a scaling factor to the weighting value assigned to those received distraction indicators which are identified as being related. At step 305 a summer module 208 sums the weighting values to produce an output value indicating a risk level.

In a further example embodiment, at step 306 of FIG. 3, a comparator 212 compares an output value of the summer 208 with a predetermined threshold value and if the threshold value is exceeded, generates a modified output signal indicating a risk level.

The apparatus 101 of FIG. 2 may be located in a vehicle 216 and utilised in an automotive application for generating an indicator of a level of risk which may be utilised by the vehicle's risk assessment or control system. As an example of such an application, FIG. 2 shows seven distraction indicators 201 input to the apparatus 101. The distraction indicators fall into two categories. For the purposes of this example, a first category is defined as one relating generally to driving conditions and includes age of the driver, ambient light level, rain indicator, TPMS (tyre pressure status). The second category is defined as relating generally to factors which affect driver concentration and comprise; number of passengers, radio operation, navigation system operation. The distraction indicators comprising the first category are processed together to generate a risk level on a first channel. The distraction indicators comprising the second category are processed together to generate a second risk level indicator on a second channel.

In a first example, the inputs 201 report the following conditions; the age of the driver is 80 years, it is night-time and raining, there are two passengers present in the vehicle, the radio is on, the navigation system is in use, the TPMS indicates normal pressure readings.

Each distraction indicator is assigned a pre-determined weighting value. In this example, the weighting values of those distraction indicators comprising the first channel are assigned as follows; age; 27, low ambient light; 10 rain: 20. As the TPMS does not report any anomaly, then this distraction indicator can be ignored (equivalent to a weighting of zero). The combination of rain and darkness constitutes a greater risk than the sum of these two indicators as individual inputs. That is to say that the risk attributable to one depends on the status of the other. These two distraction indicators have been designated as "related" and this fact is known by the third module 205 which identifies them as such. As a consequence, the fourth module 207 modifies their weighting values by a scaling factor In this example, a scaling factor of 2 is applied to the weighting values for the rain and ambient light level distraction indicators. Hence for the first category, the weighting values now comprise, age 27, night time: 20, rain: 40. These weighting values are summed by the summer sub-module 209 to produce an output value of 87. This value is compared in a comparator sub-module 212 with a pre-determined threshold value. In this example, the threshold value is set at 80. As the threshold is exceeded, the comparator sub-module 212 generates a risk indicator on a first output channel line 214.

For the second category, in this example, the assigned, pre-determined weighting values are; passenger count: 40, radio on: 10, navigation system in use: 10. The radio operation and navigation system distraction indicators may be designated as being related (both constituting a source for diverting the attention of the driver from his primary task of driving the vehicle). Hence, a scaling factor of 2 is applied (by the fourth module 207) to the weighting values for the radio and navigation system indicators. So for the second category, the weighting values now comprise, passenger count: 40, radio; 20, navigation system; 20. These weighting values are summed by the summer sub-module 210 to produce an output value of 60. This value is compared in a comparator sub-module 213 with a pre-determined threshold value. In this example, the threshold value is set at 50. As the threshold is exceeded, the comparator sub-module 213 generates a risk indicator on a second output channel line 215.

Combinational logic may be used (by the third module 205) for example to test relationships between distraction indicator inputs. Such logical processes may be employed to determine whether a condition is true. For example, rain AND dark or fog AND dark or, as another example, rain AND dark AND driver age greater than 50 years. If the relationships are true then the scale factor may be applied to the weighting values attributed to the relevant inputs. The scale factor may be the same for each input or it may be different.

In a second example, the distraction indicators of the first category change so that the driver's age is given as 30 years, it is raining but daytime and the TPMS still reports normal readings. In this case, the weighting values may be assigned as follows; age: 10%, rain: 20%, Because there is now no indication that it is dark, the third module does not identify any related distraction indicators. Therefore no scaling factor is applied to any weighting values. So the sum of the weighting values which is determined by the summer module 209 is 30%. This is below the threshold set by the comparator sub-module 212. Therefore no risk indicator signal is generated on the first channel output line 214.

It will be understood that any number of categories and any number of channels may be configured and not limited to the examples given herein. The types of distraction indicator comprising any category are also a matter of choice. Distraction indicators of a greater or lesser number than described in the examples herein and distraction indicators relating to factors other than those given in the described examples are contemplated to fall within the scope of the invention as set forth in the appended claims.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

As an example a tangible computer program product may be provided, having executable code stored therein for executing a process to perform a method for generating an indicator of a risk level in an operating system, the tangible computer program product comprising code for receiving a plurality of distraction indicators wherein at least one of said distraction indicators is designated as being related to at least one other of said distraction indicators, assigning a weighting value to said distraction indicators, identifying distraction indicators which are related, modifying the weighting values assigned to those distraction indicators which are identified as being related by a scaling factor, and summing the weighting values to produce an output value indicating a risk level.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between functional and logic blocks or modules are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. For example, the individual modules illustrated in FIG. 2 may be combined to form fewer modules or just one module. Further, the entire functionality of the modules shown in FIG. 2 may be implemented in an integrated circuit. That is to say that apparatus for generating an indicator of a risk level in a manually-operated system may be implemented in an integrated circuit. Such an integrated circuit may be a package containing one or more dies.

Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. An apparatus for generating an indicator of a risk level in an operating system, the apparatus comprising:
   a first module arranged to receive a plurality of distraction indicators, wherein at least one of said distraction indicators is designated as being related to at least one other of said distraction indicators;
   a memory for storing weighting values;
   a second module arranged to assign a stored weighting value to each of said distraction indicators;
   a third module arranged to identify distraction indicators which are related;
   storage circuitry for storing scaling factors;
   a fourth module arranged to modify the weighting values assigned to those distraction indicators which are identified as being related; and
   a summer for summing the weighting values to produce an output value indicating a risk level.

2. The apparatus of claim 1 further comprising: a comparator arranged to compare the output value with a predetermined threshold value, and if the threshold value is exceeded, generate a modified output signal indicating a risk level.

3. The apparatus of claim 1 wherein related distraction indicators comprise at least two distraction indicators relating to environmental conditions, or to system performance, or to an operator concentration level.

4. The apparatus of claim 1 wherein a received distraction indicator is assigned a weighting value which is dependent on the degree to which the distraction indicator constitutes a risk.

5. The apparatus of claim 1 wherein a distraction indicator comprises at least one selected from a group consisting of a vehicle on-board sensor output, a vehicle driving condition indicator output, stored data relating to vehicle driver attributes, a vehicle on-board navigation system output.

6. A vehicle comprising the apparatus of claim 1.

7. The apparatus according to claim 1 wherein the apparatus is implemented in an integrated circuit.

* * * * *